United States Patent [19]
Bushong

[11] Patent Number: 5,669,187
[45] Date of Patent: Sep. 23, 1997

[54] RODENT GUARD

[76] Inventor: Russell Bushong, 11311 Daisy La., Saginaw, Mich. 48609

[21] Appl. No.: 621,452

[22] Filed: Mar. 25, 1996

[51] Int. Cl.[6] .................................................. E04B 1/72
[52] U.S. Cl. .................... 52/101; 52/169.12; 52/799.12; 52/800.11; 52/DIG. 3
[58] Field of Search ........................ 52/101, 169.1, 52/169.12, DIG. 3, 799.12, 800.11, 802.11; 119/487, 491, 492, 502, 436; 428/256, 121, 122

[56] References Cited

U.S. PATENT DOCUMENTS

| | | | |
|---|---|---|---|
| 494,848 | 4/1893 | Durkin . | |
| 2,961,255 | 11/1960 | Troott | 52/DIG. 3 X |
| 3,218,091 | 11/1965 | Doak | 52/DIG. 3 X |
| 3,708,931 | 1/1973 | Button . | |
| 3,753,323 | 8/1973 | Nesbitt . | |
| 3,791,665 | 2/1974 | McAvoy | 52/DIG. 3 X |
| 4,043,088 | 8/1977 | Payton . | |
| 4,308,702 | 1/1982 | Rajewski | 428/122 X |
| 4,689,926 | 9/1987 | McDonald . | |
| 4,711,058 | 12/1987 | Patton . | |
| 4,738,061 | 4/1988 | Herndon | 52/DIG. 3 X |
| 5,267,724 | 12/1993 | Heath et al. | 119/502 X |
| 5,339,579 | 8/1994 | Woodyer et al. | 52/799.12 X |
| 5,410,837 | 5/1995 | Kazzyk . | |

Primary Examiner—Christopher T. Kent
Attorney, Agent, or Firm—John J. Swartz

[57] ABSTRACT

A rodent guard for precluding the above and below ground passage of rodents beneath a skirt perimetrically depending from a manufactured home including an elongate barrier wall having an upper laterally inner flange for detachably coupling to the skirt and a lower, laterally outer flange for extending below ground to preclude any underground rodents from vertically passing alongside and beneath the barrier wall.

9 Claims, 2 Drawing Sheets

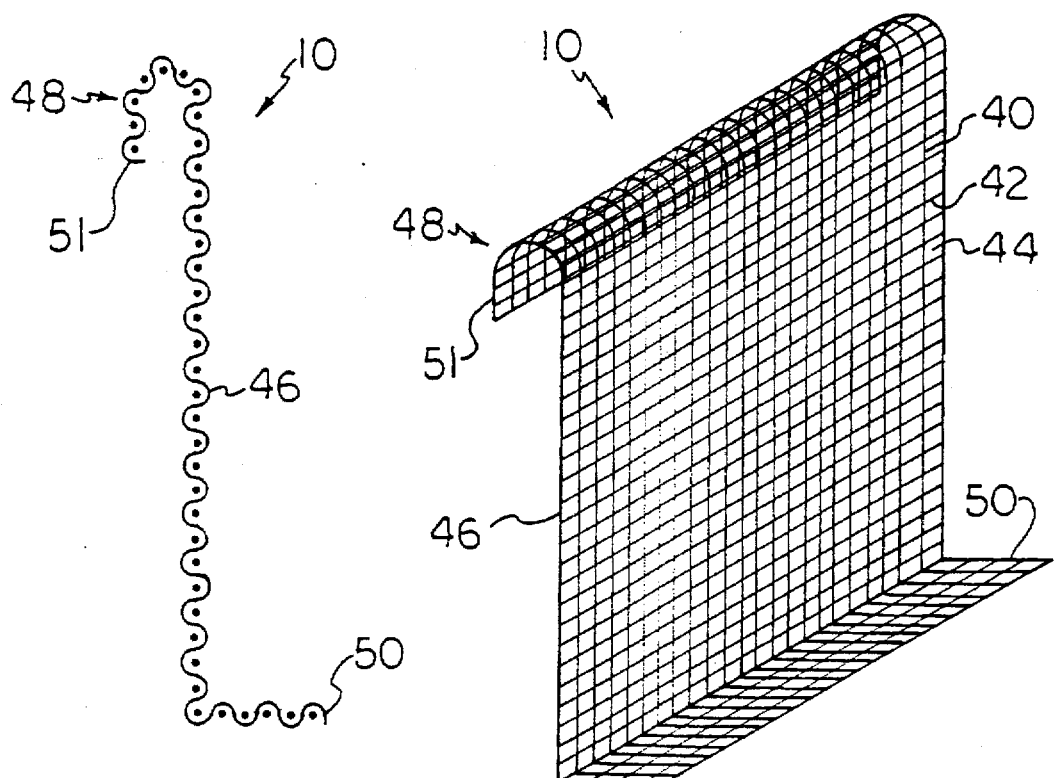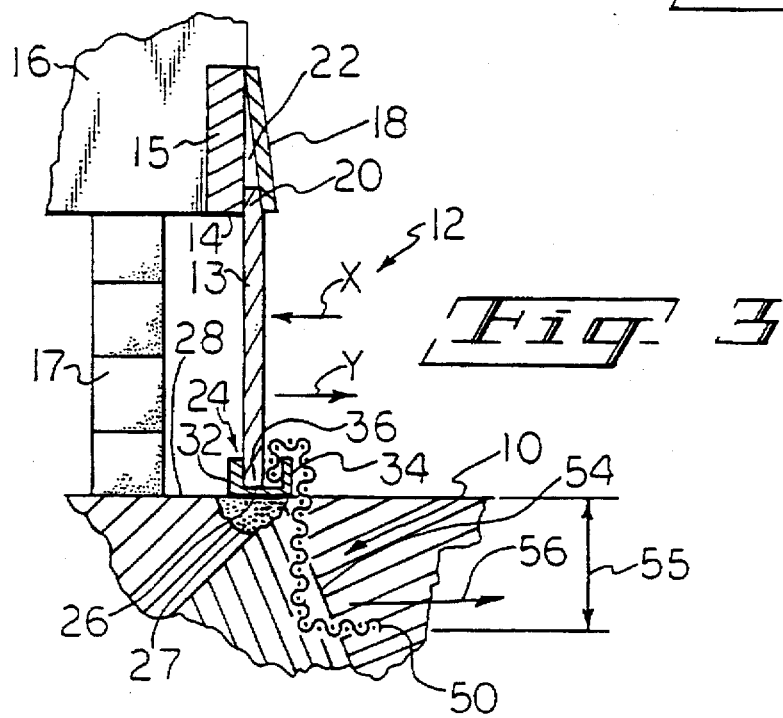

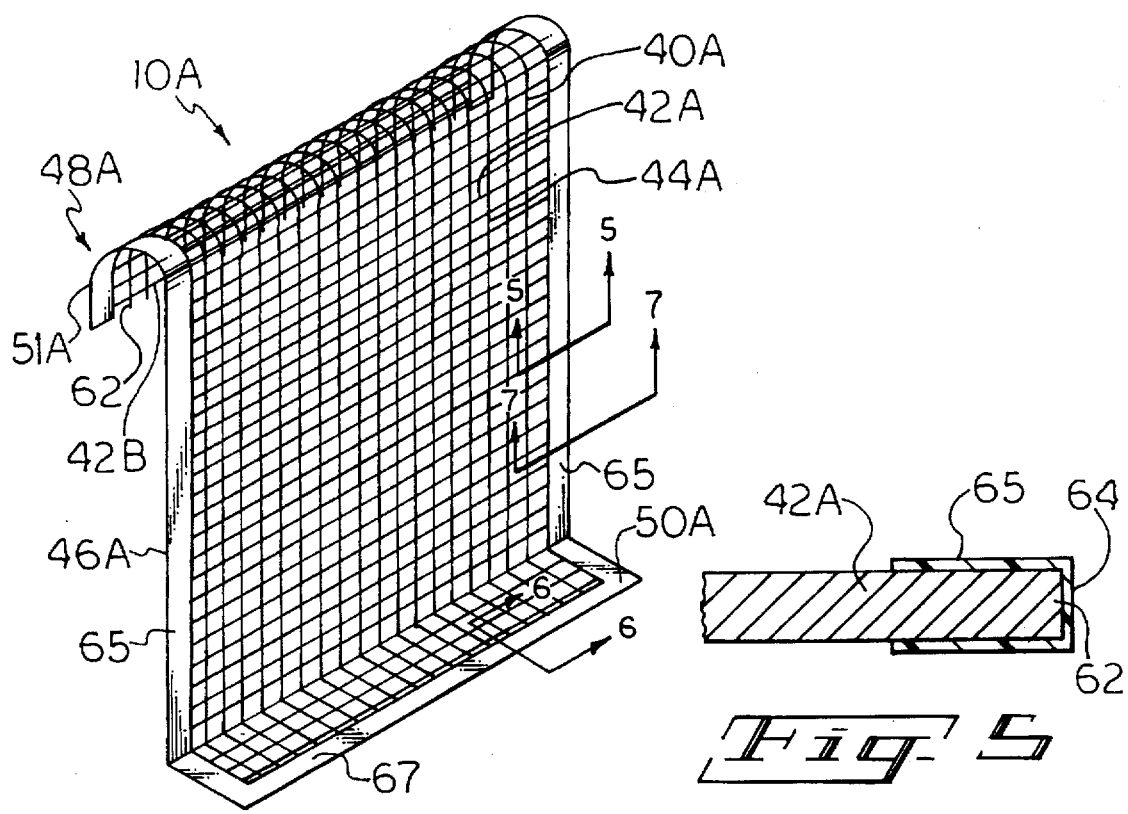

RODENT GUARD

BACKGROUND OF THE INVENTION

1. Field of the Invention

This invention relates to a rodent guard, more particularly to a guard for precluding both the above-ground and below-ground passage of rodents beneath a manufactured home skirting system.

2. Description of the Prior Art and Objects

Manufactured homes are typically statically mounted above ground and include a decorative, as well as functional, skirting system for extending between the lower perimeter of the manufactured home and the underlying ground surface. The skirting system is provided to aesthetically improve the appearance of the manufactured home plus help preclude the passage of animals and debris to the underside of the trailer, regulate temperature, and control drafts. Such skirting systems typically include a vertically extending panel which has a lower margin received in an upstanding channel that is supported on the ground surface. One such prior art system is illustrated in U.S. Pat. No. 3,753,323 issued to George G. Nesbitt on Aug. 21, 1973.

Typically, a skirting system rests on the earth's surface which typically is undulating and thus the skirting system will not evenly abut the earth's surface but rather there will be spaces therebetween which will allow unwanted rodents and the like to pass therebetween to the underside of the mobile home. It has also been found that even if the underlying earth surface is not undulating and the system is mounted flush with the ground, or even slightly below the surface of the ground, frequently, the ground underlying and abutting the skirting system will wash out or will be easily dug away by the rodent and thus, allows the rodent easy passage to the underside of the manufactured home.

Another skirting system is illustrated in U.S. Pat. No. 4,738,061 issued to Thomas W. Herndon on Apr. 19, 1988 which discloses a skirting system that is attached to the underside of the manufactured home and includes a portion extending below the earth's surface but no system for precluding the passage of rodents below that skirting system.

Accordingly, it is an object of the present invention to provide a new and novel rodent guard for a manufactured home.

It is another object of the present invention to provide a new and novel rodent guard for precluding the passage of rodents beneath a skirting system for a manufactured home.

It is yet another object of the present invention to provide a rodent guard for a manufactured home which has an elongated barrier wall provided with laterally oppositely directed flanges on the upper and lower ends thereof.

It is a further object of the present invention to provide a rodent guard of the type described having an upper flange which mates with an upturned lip provided on the skirting system of a manufactured home.

A still further object of the present invention is to provide a rodent guard of the type described which is neither bolted, screwed or otherwise coupled to the skirting system but freely floats and is adapted to mate with the skirting system of a manufactured home.

It is a still further object of the present invention is to provide a rodent guard of the type described which is not coupled to the manufactured home.

Another object of the present invention is to provide a rodent guard of the type described which has an upper, downwardly opening U-shaped channel for freely mating with a portion of the skirting system to preclude the above ground passage of rodents therebetween and includes, in its lower end, an outwardly extending underground flange for the underground passage of rodents beneath the barrier.

It is generally known that the earth will move and shift, particularly with weather changes and frost conditions and solid or ground impermeable skirting systems, of the type provided heretofore, which extend underground, will not allow the earth to freely move relative to the skirting system. The system constructed according to the present invention comprises a mesh screen which allows the earth surrounding the mesh to shift and move therethrough by passing through interstices or openings provided in the mesh and without moving the mesh screen. Accordingly, it is a further object of the present invention to provide a new and novel rodent guard of the type described comprising a mesh screen.

It is yet another object of the present invention to provide a rodent guard of the type described comprising an underground mesh screen having a plurality of interstices therethrough for the free passage of surrounding earth.

It is an object of the present invention to provide a rodent guard of the type described which will minimize shifting with earth shifts due to frosts, heaving and the like.

The typical prior art skirting system is not stabilized adjacent the ground and thus, external forces, exerted thereon by the ambient wind and earth shifting, displaces the skirt which typically ends up unsightly. Accordingly, it is another object of the present invention to provide a new and novel rodent guard which will substantially stabilize the skirting of a manufactured home.

The rodent guard constructed according to the present invention is formed from a mesh screen having a plurality of vertically spaced apart horizontal bars integrally coupled to a plurality of horizontally spaced vertical bars. When the screen is sheared to the size desired, the remaining terminal ends of the horizontal bars project horizontally outwardly beyond the marginal ones of the vertical bars and the remaining terminal ends of the vertical bars project vertically outwardly beyond the marginal ones of the horizontal bars. Such terminal ends can be injurious to the user. Accordingly, it is another object of the present invention to provide a rodent guard of the type described comprising a mesh screen having a protective coating covering at least a portion of the sharp, pointed terminal ends.

Other objects and advantages of the present invention will become apparent to those of ordinary skill in the art as the description thereof proceeds.

SUMMARY OF THE INVENTION

A rodent guard for precluding the passage of rodents beneath a manufactured home skirting system comprising: an elongate barrier wall, an upper above ground barrier flange on one lateral side of the barrier wall, and a lower, under ground barrier flange on the laterally opposite side of the barrier wall.

DESCRIPTION OF THE DRAWINGS

The invention may be more readily understood by referring to the accompanying drawings, in which:

FIG. 1 is an end elevational view of a rodent guard constructed according to the present invention;

FIG. 2 is a perspective view thereof;

FIG. 3 is a sectional end view illustrating the rodent guard constructed according to the present invention mounted on a skirting system for a manufactured home;

FIG. 4 is a perspective view of a rodent guard constructed according to a slightly modified embodiment;

FIG. 5 is an enlarged under plan sectional view, taken through one of the horizontally disposed bars along the line 5—5 of FIG. 4;

FIG. 6 is an enlarged end sectional view taken through one of the vertically disposed bars along the line 6—6 of FIG. 4; and FIG. 7 is a view similar to FIG. 5 but taken along the section line 7—7 which passes between two of the horizontally disposed bars to better illustrate the encapulating border cover.

DESCRIPTION OF PREFERRED EMBODIMENT

A rodent guard, generally designated 10, constructed according to the present invention is particularly adapted for use with a skirting system, generally designated 12, perimetrically extending about the outer lower perimeter 14 of a manufactured home 16. The manufactured home 16 is statically supported in spaced relation with the underlying earth surface 28 via spacers 17.

The manufactured home 16 typically includes a lower, horizontal strip 18 that may be loosened so that the upper lip 20 of the skirting system 12 may be inserted in the space 22 between the strip 18 and the outer lower wall 15 of the manufactured home 16. The skirting system 12 includes a plurality of longitudinally aligned, interconnected vertical panels 13 having an upper lip 20 which can be introduced under the loosened strip 18.

The skirting system 12 typically includes an elongate, upwardly opening, lower retainer or channel, generally designated 24, having a bottom wall 26 for resting on the surface 28 of the ground or earth 27. The channel 24 includes a laterally inner upstanding leg 32 and laterally outer upstanding leg or lip 34 spaced a slight distance from the lower terminal margin 36 of the panel 13. The lower marginal end 36 of the panels 13 are freely received in the channel 24 to allow slight vertical movement therebetween.

The construction described heretofore is conventional. Typically, the earth 27 immediately below the channel 24 will wash out or be easily dug out by a rodent to allow the rodents passage to the underside of the house 16.

When the dirt 27 is removed, the skirt 13 becomes increasingly unstable and forces, such as wind blowing on the skirt 13 in the direction of the arrow X, will dislodge the lower end 36 of the panels 13, thereby causing the panels 13 to become unsightly and freely allow the passage of rodents.

The rodent guard 10, constructed according to the present invention, will inhibit the passage of rodents to the underside of the skirting system 12 and will stabilize the skirting systems 12. The rodent guard 10 includes a mesh screen having a plurality of vertically extending longitudinally spaced apart vertical wires 40 welded or otherwise suitably secured to a plurality of vertically spaced apart, horizontally disposed horizontal wires 42 to define a plurality of ground receiving openings or interstices 44. The guard 10 includes an elongate, upstanding or vertical barrier wall, generally designated 46, including, at its upper end, a laterally inwardly offset flange 48 and at its lower end, a laterally outwardly offset barrier flange 50. The flange 48 is above ground whereas the barrier flange 50 is below the earth's surface and extends generally perpendicularly to the plane of the barrier wall 46. The guard 10 is typically formed from a unitary piece of galvanized steel mesh having a quarter inch opening 44 but may be manufactured from aluminum and/or stainless steel.

The interstices 44 also allow underground electrical wires or small water pipes to pass therethrough without having to cut holes in the rodent guard.

The upper flange 48 includes a downwardly opening, generally U-shaped channel, having a down-turned elongate terminal lip 51 which is adapted to receive the laterally outer, upstanding lip 34 of the channel member 24. The flange 48 is not bolted, screwed or otherwise attached to the manufactured home 16 nor to the skirting system 12 but freely vertically floats to allow for slight variations and shifting in the earth's surface but yet maintaining the integrity of the barrier to preclude rodents from passing between the flange 48 and the cooperating U-shaped retainer 24. Thus, in addition to functioning to inhibit the passage of rodents beneath the skirting system 12, the rodent guard 10 substantially stabilizes and increases the stability of the skirting 12.

THE OPERATION

The rodent guard 10, constructed according to the present invention, will be primarily utilized with a manufactured home 16 having a skirting system 12 provided with a plurality of interconnected panels 13 which are received at their lower ends in an upstanding channel 24 resting atop the earth's surface 28. The user will temporarily remove the laterally outer earth along the designated by the area 54, to a depth 55 and will install the guard 10 as illustrated in FIG. 3 with the upper terminal lip 51 being received between the lower marginal edge 36 of the panel 13 and the upturned lip or flange 34. The temporarily removed earth 54 is returned to the position illustrated in FIG. 3.

The terminal lip 51 is not coupled to the flange 34 but is completely moveable relative thereto for slight undulation in the earth's surface and for slight vertical variations in earth movement. The presence of the guard 12 buried under the earth 54 will stabilize the lower end 36 of the skirting system 12. If wind or other above ground forces are exerted on the skirt 13, in the direction of the arrow X for example, the lip 51 will exert force, in the direction of the arrow Y, on the upturned lip As illustrated, the temporarily removed earth 54 is replaced in, the position illustrated in FIG. 3 and will freely pass through the interstices and openings 44 in the barrier wall 46 as the earth shifts and moves with changing weather and conditions. As the ground heaves and shifts with frost conditions and the like, the dirt will tend to move relative to the barrier as opposed to moving the barrier 10 and distorting and shifting it.

Rodents may tend to dig and remove the earth from the area designated 54 along the laterally outer side of the barrier wall 46. If the rodents dig downwardly a sufficient distance to reach the lower flange 50, the rodent will be inhibited from further direct passage and is unlikely to continue to dig laterally outwardly, in a direction of the arrow 56. Thus, the rodent's purpose will be frustrated and the security of the underside of the manufactured home from rodents will be secured.

ALTERNATE EMBODIMENT

Referring now more particularly to FIGS. 4–7, a rodent guard 10A is illustrated and is similar to the rodent guard 10 and generally similar parts will be referred to by generally similar reference characters followed by the letter A subscript.

It may occur that, during the formation and shearing of the stainless steel mesh screen, the terminal ends 60 of the horizontal wires 42A will project laterally outwardly beyond the two laterally outer most or marginal ones 40B of the vertical wires 40A and the terminal ends 62 of the vertical wires 40A and 40B may project vertically outwardly beyond the upper and lower marginal ones 42B and 42C of the horizontal wires 42 to provide sharp projections which could cause injury to the user during installation. If desired, the marginal edge portions, including the projections 60 and lower terminal end side projections 62 and the marginal wires 40B and 42C may be coated with a layer 64 of plastic which bonds to the stainless steel mesh along the vertical margins 65 and the lower margin 67. The plastic marginal coating protects users from being inadvertently "poked" by the side terminal end projections 60 and lower terminal end projections 62.

A process which can be used to coat or encapulate the margins is to temporarily dip the lower marginal wires 40B and side marginal wires 42C and the side marginal projections 60 and lower marginal projections 62 into a liquid plastic bath.

The uppermost marginal wire 42B and uppermost adjacent projections 62 are not encapulated so as not to interfere with the installation between the upstanding lip 34 and the lower margin 36 of the skirt panel 13.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. A rodent guard for a generally vertical, manufactured home skirting system including a lower margin provided with an upturned lip, said guard comprising:
    an elongate barrier wall having
        upper and lower ends;
        upper, above ground barrier flange means, on one lateral side of said wall for being received by said upturned lip to inhibit above ground passage of rodents between said above ground flange means and said skirting system; and
        lower, underground, barrier flange means, on an opposite lateral side of said wall opposite said one lateral side, for being received in the ground and inhibiting any below ground rodents from passing downwardly alongside and beneath said barrier wall;
    said upper barrier flange means comprising an elongate, downwardly opening channel having an elongate terminal lip adapted to be received by said upturned lip;
    said lower barrier flange means comprising a generally horizontal barrier extending generally perpendicular to said lower end of said barrier wall;
    said barrier wall comprising a mesh member having a plurality of interstices therein for receiving and freely passing underground dirt.

2. The rodent guard set forth in claim 1 wherein said elongate barrier wall includes a peripherally extending margin; and further including a protective coating enveloping said peripherally extending margin.

3. The rodent guard set forth in claim 1 wherein said mesh member includes
    a first plurality of vertical, horizontally spaced apart bars, and
    a second plurality of horizontal, vertically spaced bars spanning and coupled to said first plurality of bars;
    said first plurality of bars including vertically spaced upper and lower terminal ends which project vertically outwardly beyond said second plurality of bars;
    said second plurality of bars including horizontally spaced terminal ends which project horizontally outwardly beyond said first plurality of bars; and
    a protective coating enveloping said horizontally spaced terminal ends and at least said lower terminal ends.

4. In combination:
    a manufactured home having an underside;
    means for supporting said manufactured home on the ground such that said underside is in spaced relation with the ground;
    a perimetrically extending skirting system extending about a perimeter of said underside including
    a vertical panel, extending downwardly from said manufactured home, having
        an upper end coupled to said manufactured home and a lower end;
        an elongate, upwardly opening lower retainer, supported on the ground and having a laterally outer, upturned lip, receiving said lower end of said panel;
    a rodent guard for inhibiting passage of rodents beneath said skirting system comprising:
    upstanding barrier wall means for precluding the passage of rodents beneath said skirting system including
        an above ground upper end,
        a below ground lower end, and
        inner and outer lateral sides;
    said upper end having an integral, laterally inwardly offset, above ground barrier flange for mating with said upturned lip of said lower retainer for inhibiting above ground passage of rodents between said barrier wall means and said skirting system;
    said lower end having an integral, laterally outwardly offset, below ground barrier flange for inhibiting the below ground passage of rodents.

5. The combination set forth in claim 4 wherein said barrier wall means comprises a mesh screen.

6. The combination set forth in claim 5 wherein said vertical panel includes a peripheral edge portion; and further including a protective coating covering at least a portion of said peripheral edge portion.

7. A rodent guard for preventing passage of rodents to an underside of a manufactured home having a perimeter and being statically supported such that the underside of the manufactured home is disposed in spaced relation with an underlying ground surface, said guard comprising:
    upstanding, elongate, barrier wall means for extending about the perimeter of said underside of said manufactured home to inhibit above ground and under ground passage of rodents to the underside of the manufactured home;
    said barrier wall means including
        an above ground upper end,
        a below ground lower end having a lower terminal margin, and
        laterally inner and outer lateral sides having horizontally spaced apart margins spanning between said upper end and said lower end;
    said upper end having an integral, laterally inwardly offset, above ground barrier flange;
    said lower end having an integral, laterally outwardly offset, below ground barrier flange means for being received in the ground and inhibiting rodents from passing said lower end;

said laterally inwardly offset, above ground barrier flange including an elongate, downturned, terminal lip;

said below ground barrier flange being generally perpendicular to said barrier wall means;

said barrier wall means comprising a mesh screen.

8. The rodent guard set forth in claim 7 and including a protective coating covering and being bonded to said horizontally spaced apart margins and said lower terminal margin.

9. In combination with skirting for a statically supported manufactured home including:

generally vertically disposed panel means having an upper margin coupled to said manufactured home and a lower margin;

an elongate, upwardly opening lower retainer for receiving said lower margin of said panel means;

rodent guard means for precluding passage of rodents beneath said skirting including:

an elongate upstanding wall having upper and lower vertically spaced flanges on laterally opposite sides thereof;

said upper flange including above ground barrier means cooperating with said upwardly opening lower retainer to inhibit above ground passage of rodents therebetween;

said lower flange, adapted to be disposed below ground, for inhibiting any below ground rodents from passing beneath said elongate upstanding wall;

said upstanding wall comprising a mesh member having a plurality of interstices therein for receiving and freely passing underground dirt.

* * * * *